May 16, 1950     H. A. COON     2,508,230
ICE AUGER
Filed April 22, 1946
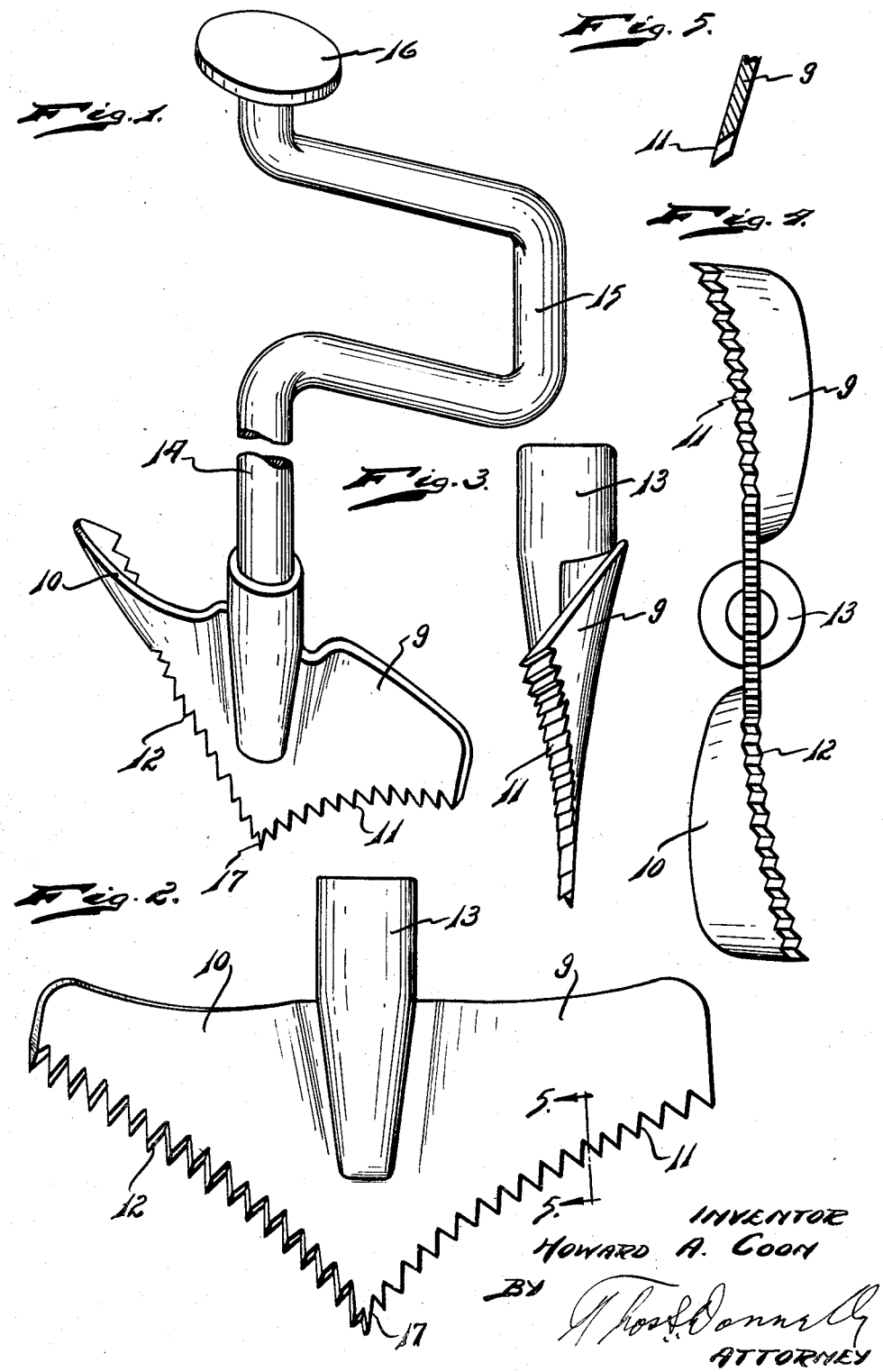

Patented May 16, 1950

2,508,230

UNITED STATES PATENT OFFICE 2,508,230

ICE AUGER

Howard A. Coon, Highland Park, Mich.

Application April 22, 1946, Serial No. 663,876

2 Claims. (Cl. 255—61)

My invention relates to a new and useful improvement in an ice auger which will be simple in structure, economical to manufacture, durable and highly efficient in use.

Another object of the invention is the provision of an ice auger so constructed and arranged that the cutting element is provided with teeth on angularly directed edges which are formed arcuate.

Other objects will appear hereinafter.

It is recognized that various modifications and changes may be made in the detail of structure illustrated without departing from the invention itself and it is intended that these shall be embraced wthin the claims which form a part hereof.

Forming a part of this application are drawings in which:

Fig. 1 is a perspective view of the invention with a part broken away,

Fig. 2 is a side elevational view of the cutting blade used in the invention,

Fig. 3 is an end elevational view of the blade used in the invention,

Fig. 4 is a bottom plan view of the cutting element used in the invention,

Fig. 5 is a fragmentary sectional view taken on line 5—5 of Fig. 2.

As shown in the drawings I provide a cutting element which is formed from a pair blades 9 and 10 radiating outwardly from a sleeve 13 which is preferably internally threaded. These blades 9 and 10 are curved so that they are arcuate and present a concave surface on one side. This surface is also arcuate from the lower edge to the upper edge so that the curvature of the blades 9 and 10 may be said to be spherical. The lower edges of the blades 9 and 10 are directed angularly to each other and provided with the teeth 11 and 12. These teeth are faced towards the concave side of the blade on which they are formed and it will be noted that the concave side of the blade 10 is on the side opposite to that of the concave side of the blade 9. The apex of the triangle determined by the tooth bearing edges is centrally of the sleeve 13. Fixed in the sleeve 13 is a stem 14. This stem may be threaded into the sleeve 13 if it is internally threaded or if the sleeve 13 is not internally threaded the stem 14 may be secured therein by a press-fit and then by brazing, welding or in any other suitable manner. This stem or rod 14 may be termed the rotating member which effects a rotating of the cutting blades and this stem or rod 14 is provided intermediate its end with crank 15 and at at its upper end with the hand grip 16.

The invention is very effective in cutting holes in ice and is particularly useful to a fisherman fishing through the ice who desires to rapidly cut a number of holes in the ice. In use, the operator merely sinks the point 17 into the ice and then begins to rotate the cutting blades by rotating the rod 14. The cutting teeth face towards the advancing face of the blade portion and this advancing face is the concave face. Experience has shown that the device will very rapidly cut a hole of predetermined size in the ice and as the cutting proceeds and the loose particles of ice are produced they will ride upwardly on the inclined concave face of the cutting blade and due to the fact that these cutting blades are formed with the circular formation referred to, a clean hole is always provided so that as the auger breaks through the ice very few particles of ice are precipitated through the opening thus formed. The device has also proven itself quite durable and is of such rugged construction that repairing and re-sharpening need not be resorted to.

What I claim as new is:

1. An ice auger of the class described comprising: a sleeve; a pair of blades projecting outwardly radially from opposite sides of said sleeve said blades having a concave advancing face, said face being formed arcuate in a direction axially of said sleeve and also in a direction transverse to the axis of said sleeve, the lower edges of said blades being inclined towards each other to define a triangle with the apex in the axis of said sleeve, said inclined edges being arcuate and having teeth formed thereon, said teeth being faced towards the advancing face of the blade on which formed.

2. An ice auger of the class described comprising: a sleeve; a pair of blades projecting outwardly radially from opposite sides of said sleeve said blades having a concave advancing face, said face being formed arcuate in a direction axially of said sleeve and also in a direction transverse to the axis of said sleeve, the lower edges of said blades being inclined towards each other to define a triangle with the apex in the axis of said sleeve, said inclined edges being arcuate and having teeth formed thereon, said teeth being faced towards the advancing face of the blade on which formed; and crank bearing means for rotating said blades.

HOWARD A. COON.

REFERENCES CITED

The following references are of record in the file of this patent:

UNITED STATES PATENTS

| Number | Name | Date |
|---|---|---|
| 400,939 | Newman | Apr. 9, 1889 |
| 568,067 | Fuller | Sept. 22, 1896 |
| 1,409,258 | Stenger | Mar. 14, 1922 |
| 1,881,024 | Lang | Oct. 4, 1932 |
| 2,057,365 | Carlson | Oct. 13, 1936 |
| 2,320,610 | Kandle | June 1, 1943 |
| 2,393,282 | Berlin | Jan. 22, 1946 |